Dec. 19, 1967  NOBUTOSHI KIHARA  3,359,364
RECORDING AND/OR REPRODUCING SYSTEM
Filed March 27, 1964  6 Sheets-Sheet 3
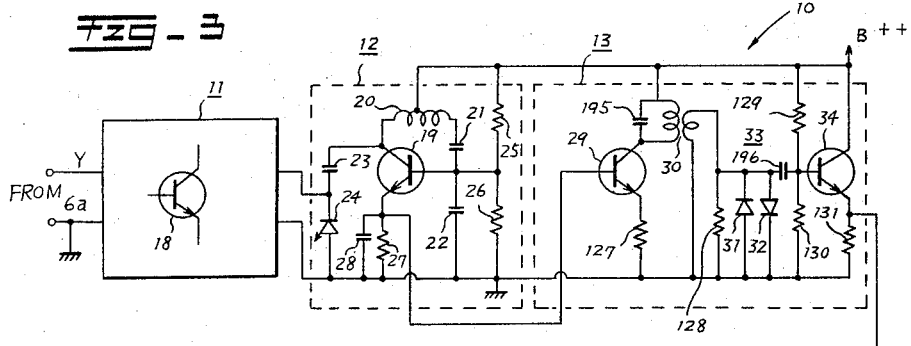
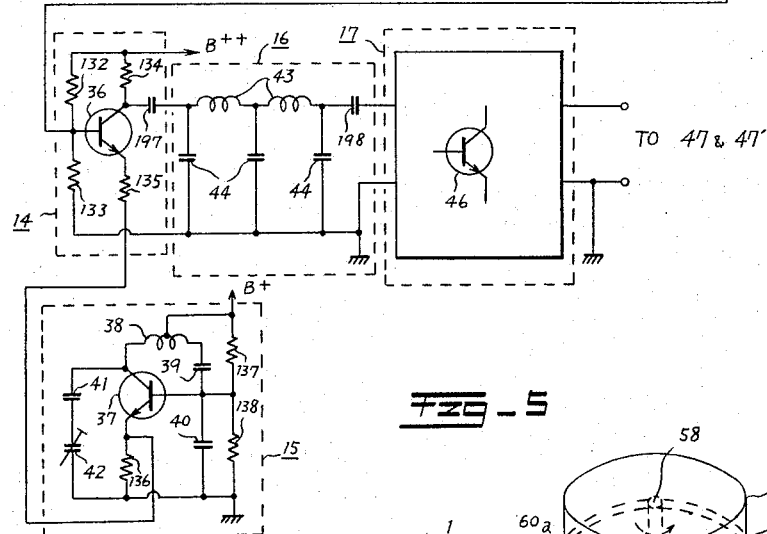
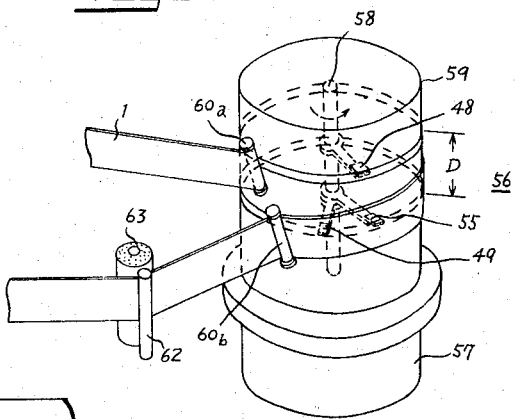
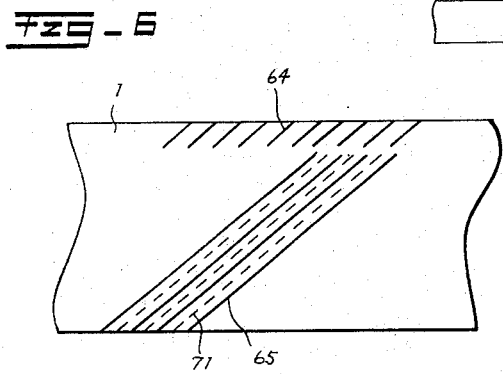
Inventor
Nobutoshi Kihara
by  Hill, Sherman, Meroni, Gross & Simpson Attys.

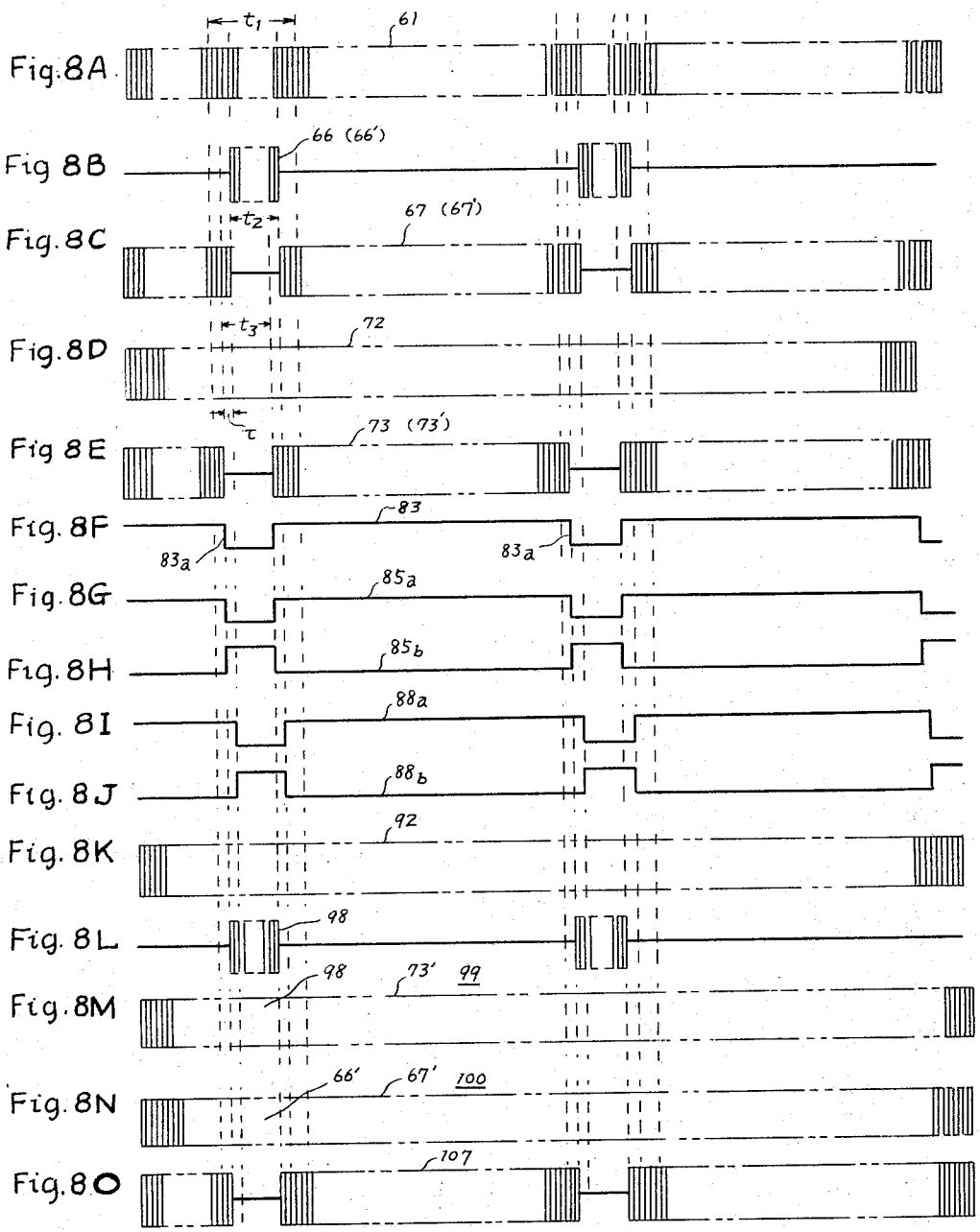

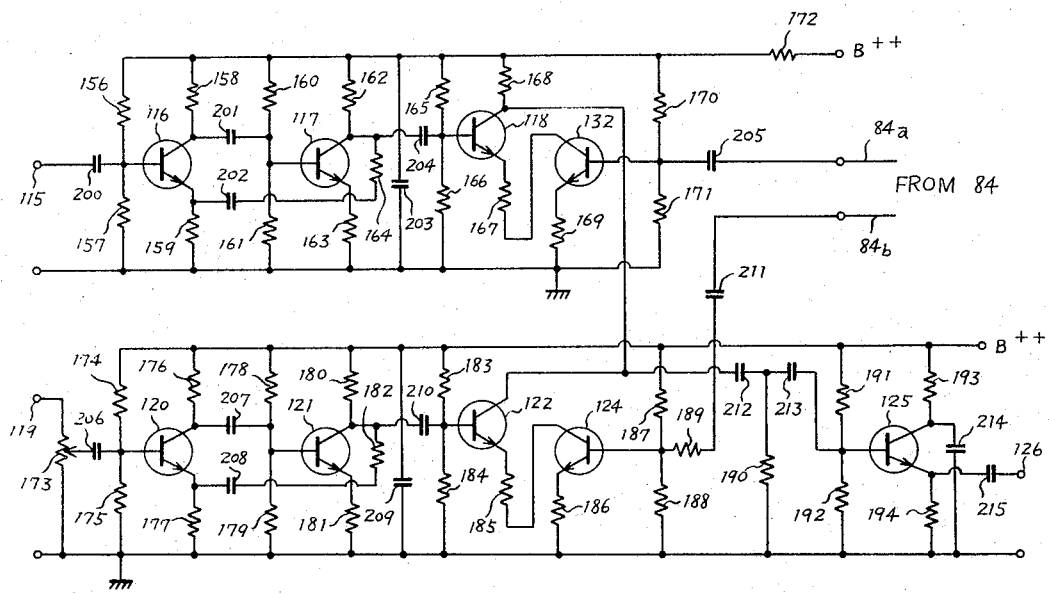

United States Patent Office 3,359,364
Patented Dec. 19, 1967

3,359,364
RECORDING AND/OR REPRODUCING SYSTEM
Nobutoshi Kihara, Shinagawa-ku, Tokyo, Japan, assignor to Sony Corporation, Tokyo, Japan, a corporation of Japan
Filed Mar. 27, 1964, Ser. No. 355,276
Claims priority, application Japan, Apr. 1, 1963, 38/16,761
2 Claims. (Cl. 178—5.4)

ABSTRACT OF THE DISCLOSURE

A color television magnetic recording and/or reproducing system for a three signal component input, a circuit for receiving a luminance signal and providing an FM luminance signal and an FM carrier modulated by the vertical synchronizing signal for recording on separate channels, a mixing and frequency modulating circuit for a chrominance signal composed of two of the input signals to provide a composite signal for recording. An analogous set of demodulating components for providing three output signals from the recorded medium which corresponds to the three input signals.

---

This invention relates generally to a recording and/or reproducing system and particularly to a recording and reproducing system suitable for recording and reproducing color television signals as well as monochrome television signals.

In my copending application U.S. Ser. No. 202,742, filed June 15, 1962, now U.S. Patent No. 3,188,385 issued June 8, 1965 a novel magnetic recording and reproducing system has been proposed. In the system of the copending application two magnetic recording zones are formed on a wide magnetic tape by two magnetic heads. The recording zones respectively consist of series of tracks with each track extending obliquely to the direction of travel of the tape. In this case essentially only vertical blanking signals are recorded in one recording zone on the magnetic tape while video signals other than the vertical blanking signals are recorded in the other zone.

In the above system the two magnetic heads are assembled on a rotary shaft, with a predetermined distance between the heads in the direction axially of the shaft and with a predetermined acute angle therebetween with respect to a plane at right angles to the shaft. The magnetic tape is transported obliquely to the path of the rotary magnetic heads and is arranged relative to the magnetic heads so that when the one magnetic head starts to scan the tape the other is finishing a scanning operation.

According to the foregoing magnetic recording and reproducing system, since video signals of one field or one frame can be reproduced every turn of the rotary magnetic heads, no joints are caused in the reproduced image. Further, since the vertical blanking signals are recorded on the magnetic tape separately, the angle of inclination of each track on the tape to the direction of travel of the tape can be made small and accordingly the value of the offset vertically between the supply reel and the take-up reel for the tape can be reduced. Consequently the system described above has the advantages that the device can be relatively compact and that signals can be accurately recorded or reproduced without the necessity for making the characteristics of the two magnetic heads equal to each other.

The system of the present invention is intended to record color television signals or to reproduce them by making use of the transducer head arrangement of my aforementioned copending application. Where a color television signal is to be recorded or reproduced a composite color television signal (now known as the NTSC standard signal) composed of a luminance signal and a chrominance signal-modulated color subcarrier may be supplied to the respective magnetic heads of the system of my copending application. In general, however, since the color signals are recorded after being converted to frequency modulated signals, beat noises are caused between the FM carrier and the color subcarrier. As a result of this, good color television signals cannot be reproduced. A further problem arises as a result of phase shift of the color subcarrier which is attendant upon jitter of the magnetic tape. In view of the foregoing, novel color television reproducing systems have been proposed in my copending application U.S. Ser. No. 146,967, filed Oct. 23, 1961, now U.S. Patent No. 3,234,323 issued Feb. 8, 1966 according to which systems, video signals capable of being recombined to generate a color picture are recorded on two series of interlaced tracks along a magnetic record medium. By way of example, in this system a Y signal component may be recorded on one series of tracks on the record medium. The second series of tracks receives a composite signal comprising an I signal component and a Q signal component the frequency spectrum of which is displaced with respect to the I signal component. In this system, the magnetic tracks may extend parallel to each other and obliquely wtih respect to the direction of movement of the record medium. The band widths of the Y signal component and of the composite I and Q signal component may be selected to be substantially equal to each other. The system of the present invention may utilize this concept of recording a Y signal component and a composite I and Q signal component on separate channels of a magnetic record medium.

It is an object of the present invention to provide a novel system for recording and/or reproducing two or more signals on a magnetic record medium.

It is a further object of the present invention to provide a system capable of utilizing certain advantageous features of my copending applications U.S. Ser. No. 202,742 and U.S. Ser. No. 146,967 as discussed above.

It is another object of the present invention to provide a system for recording and/or reproducing color video signals on a record medium.

It is still another object of the present invention to provide a system for recording and/or reproducing color signals which is characterized by the recording of a luminance signal component and a chrominance signal component of a color signal by means of respective rotary magnetic heads.

It is a still further object of the present invention to provide a system for recording and/or reproducing color signals on a magnetic tape wherein a luminance signal including a luminance signal component and a vertical blanking signal component is recorded by means of two rotary heads on respective recording zones of the magnetic tape and wherein a chrominance signal is recorded by means of a single rotary head in interlaced relation to the luminance signal component in the recording zone associated therewith.

It is still another object of the present invention to provide a transmission system for signals in which unnecessary signal components are not produced.

It is still a further object of the present invention to provide a novel processing system for a reproduced luminance signal.

It is still another object of the present invention to provide a novel rotary head assembly in which substantially no leakage is caused between magnetic heads.

Additional objects and features of the invention will appear from the following description when read in conjunction with the accompanying drawing, in which:

FIGURE 1 shows a block diagram illustrating a complete recording and/or reproducing system incorporating the present invention;

FIGURES 2A to 2E, inclusive, illustrate the frequency characteristics used in explaining the system of the present invention;

FIGURE 3 shows a circuit diagram illustrating an example of a frequency modulating circuit for the system of FIGURE 1;

FIGURES 4A to 4D, inclusive, illustrate further frequency characteristics used in explaining the system of the present invention;

FIGURE 5 is a schematic perspective view illustrating an example of a rotary magnetic head assembly for the system of FIGURE 1;

FIGURE 6 is a plan view diagrammatically illustrating record tracks on a magnetic tape such as may be scanned by the head assembly of FIGURE 5;

Figure 7A:
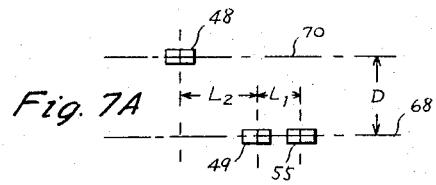
Figure 7B:
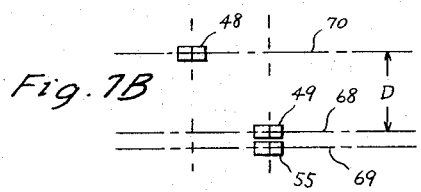
Figure 7C:
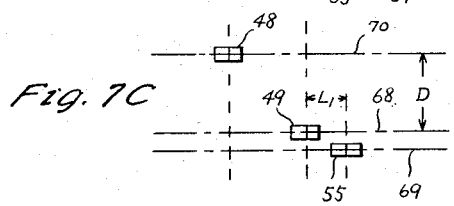
Figure 9:
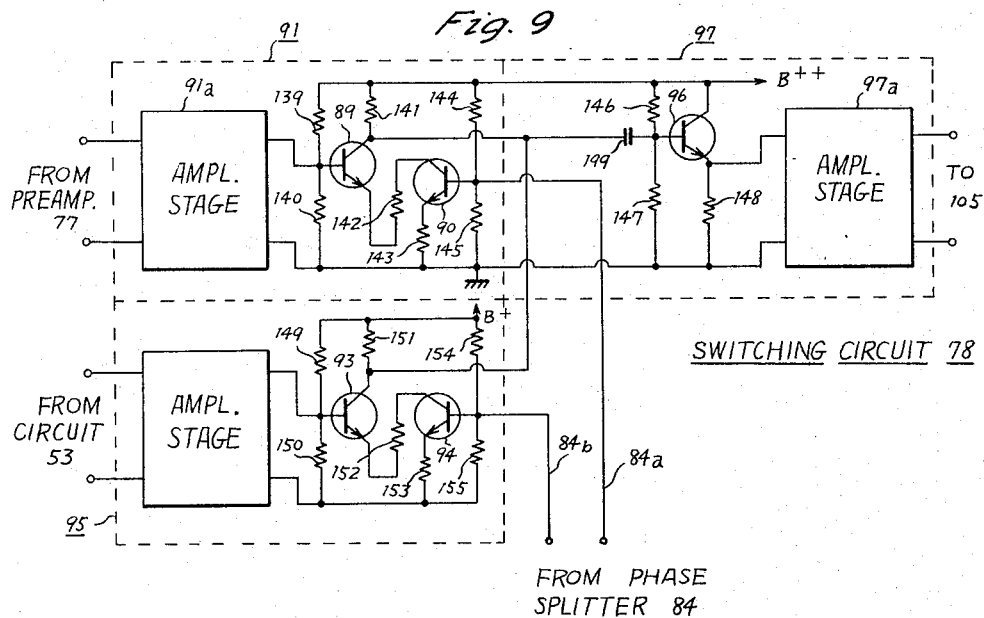

FIGURES 7A to 7C, inclusive, are schematic diagrams illustrating different head alignments for the rotary magnetic head assembly shown in FIGURE 5;

FIGURES 8A to 8O, inclusive, show signal waveforms serving to facilitate explanation of the present invention;

FIGURE 9 is a circuit diagram illustrating an example of a switching circuit for inserting the carrier frequency into the "off" periods of the reproduced intermittent chrominance signal of FIGURE 8E; and FIGURE 10 is a circuit diagram illustrating a suitable switching circuit for inserting the carrier frequency during the "off" periods of the intermittent Q signal of FIGURE 8O.

Referring to the drawing.

Figure 1:
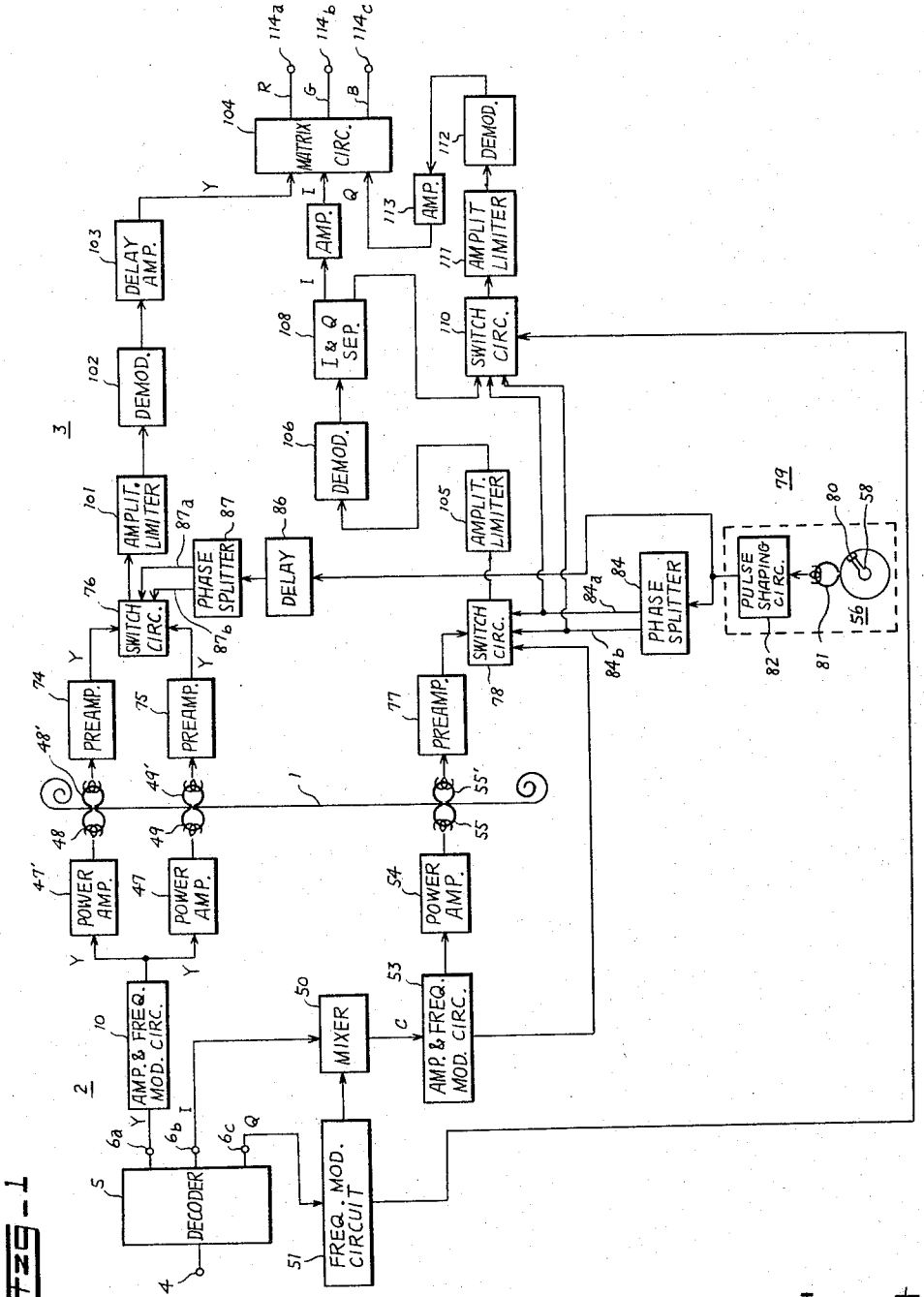

FIGURE 1 illustrates a block diagram of a magnetic video recording and/or reproducing device, which consists of a recording unit 2 in which color television signals are recorded on a magnetic tape 1 and a playback unit 3 in which the recorded signals on the tape are reproduced or played back. In the recording unit 2, 4 is an input terminal for receiving color television signals of the NTSC system, and is connected to a decoder 5. The decoder 5 has three output terminals 6a, 6b, and 6c, at which are obtained a Y signal, an I signal and a Q signal respectively. The structure of the decoder 5 is well-known and may be formed as desired, so that no detailed explanation will be made thereof. In this case, however, it is necessary that the Y signal component contain vertical blanking signals. As is well-known, the Y signal has a band width of about 0 to 4 mc./s. as shown by the curve 7 in FIGURE 2A and the I signal has a band width of approximately 0 to 1.5 mc./s. as shown by the curve 8 in FIGURE 2B and the Q signal has a band width of approximately 0 to 0.5 mc./s. as shown by the curve 9 in FIGURE 2C. The Y signal obtained at the terminal 6a is supplied to an amplifying and frequency modulating circuit 10. This amplifying and frequency modulating circuit may, as illustrated in FIGURE 3, be constructed with an amplifier 11, a variable frequency oscillator 12 connected thereto, a band-pass amplifier 13 connected thereto, a mixing circuit 14 connected thereto, a fixed frequency oscillator 15 connected thereto, a low-pass filter 16 connected to the output of the mixing circuit 14 and an amplifier 17 connected to the output of the low-pass filter 16.

The Y signal amplifying circuit 11 is represented as including a single transistor 18 in FIGURE 3, but the circuit may, of course, be formed with a plurality of transistors. The variable frequency oscillator 12 may be formed to be of the Clapp type by connecting an inductor 20 and a capacitor 21 across the collector and base of a transistor 19, a capacitor 22 across the base and the ground, and a capacitor 23 and a semiconductor diode type variable capacity element 24 usually referred to by the trademark "Vari-Cap" across the collector and the ground. 25 and 26 are resistors for base biasing, and 27 and 28 are respectively an emitter resistor and a by-pass capacitor. Across the variable capacity element 24, the Y signal including the luminance component and the vertical blanking signals are supplied from the amplifier 11 to control the oscillation frequency of oscillator 12. By way of example the oscillator 12 may operate at a frequency $f_0$ such as, for example 70 megacycles per second, when the input to the oscillator 12 from amplifier 11 is at the pedestal level of, for instance, its horizontal synchronizing signal. The frequency of oscillator 12 then deviates from 70 megacycles per second in accordance with the voltage of the Y signal. The frequency deviation is usually selected to be about ±1.5 mc./s. The reason why the carrier frequency $f_0$ is chosen extremely high such as 70 mc./s. is that the aforementioned modulated Y signal is finally converted into a signal in a range of a band width which can be recorded in a tape recording apparatus, and by using a high frequency carrier for the modulated Y signal interference such as beat noises between the modulated Y signal and the converted signal are avoided. Furthermore, the carrier frequency $f_0$ may, of course, be selected in accordance with those for the I and Q signals described later.

Figure 4A:
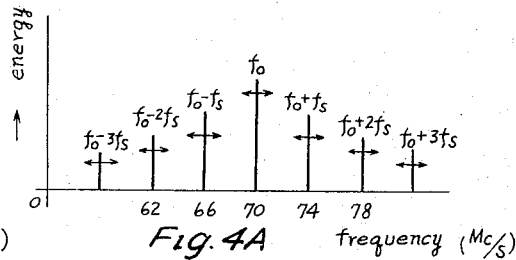

A band width of signals in a range of good linearity which can be recorded on a magnetic tape is compelled to be reduced to such as less than 10 mc./s. When a video signal is recorded after being frequency modulated in such a band, the band width of the video signal occupies, for example, 4 mc./s., so that if the highest frequency component to be transmitted is referred to as $f_s$, the energy response of the modulated Y signal obtained in the variable frequency oscillator 12 is as illustrated in FIGURE 4A.

As a result of my various experiments it has been found preferable to select the carrier frequency $f_0$ more than ten times as high as a maximum frequency $f_s$ for recording signals on a magnetic tape. This means that $f_0$ is a frequency equal to at least about 50 mc.

Figure 4B:
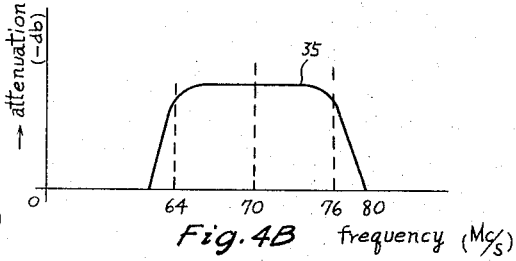

In the present invention the band-pass amplifier 13 is very important. This amplifier consists of a transistor 29 connected to the emitter of the transistor 19 of the oscillator 12 and an output transformer 30 connected to the collector of the transistor 29. Furthermore, it may include an amplitude limiting circuit 33 composed of diodes 31 and 32 connected in opposite polarity and an amplifier consisting of a transistor 34. In this band-pass amplifier essentially only a limited band width, for example of 12 mc./s. between 64 and 76 mc./s. within the spectrum of the modulated Y signal such as shown in FIGURE 4A, is permitted to pass. On account of this band-pass amplifier 13, various bad influences can be prevented which would be caused due to leakage of frequency components other than $f_0 \pm f_s$ through the oscillator 12; that is by the transmission of the leakage components $f_0 \pm 2 f_s$, $f_0 \pm 3 f_3$, etc. The reason why the band width is selected, for example, to be 12 mc./s. or so is that maximum frequency characteristic to be recorded on present magnetic tapes is considered to be substantially equal to this band width. If necessary, this band width can be changed at will to any desired range so long as the aforementioned leakage component, and particularly the undesired harmonics of relatively high energy, are removed. The curve 35 in FIGURE 4B shows the band-pass characteristic of the circuit 13.

Figure 4C:
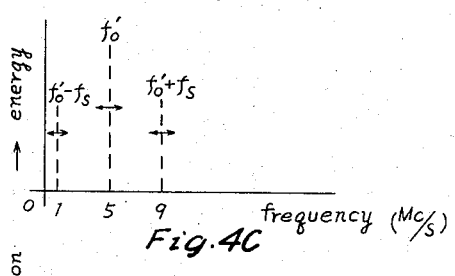

The mixing circuit 14 may be formed with a transistor 36. The modulated signal from band pass amplifier 13 is supplied, for example, to the base of the transistor 36. The local oscillator 15 having a fixed oscillating frequency is the same as the aforementioned variable frequency oscillator 12 except for the substitution of a capacitor 42 for the "Vari-Cap" 24. The oscillating frequency of the oscillator 15 is selected to be 65 mc./s. so as to obtain a low frequency modulated signal having carrier frequency $f_{0'}$ of 5 mc./s. as previously described, and is supplied, for example, to the emitter of the transistor 36. The desired low frequency modulated signal having the carrier frequency $f_{0'}$ of 5 mc./s. such as shown in FIGURE 4C is obtained at the output of mixing circuit 14 due to beat down between the modulated signal from the circuit 13 and the fixed frequency of 65 mc/s. from local oscillator 15. In this case spurious or folded components can be removed, since the band-pass amplifier 13 is arranged to supply the desired frequency modulated signal from the variable frequency oscillator 12 to the mixing circuit 14. The low-pass filter 16 may be formed, as desired, with one or more sections each including a coil 43 and a capacitor 44 or the like, and its electric constant is selected to be a value such that a band of signal frequencies within the band of the frequency modulated signals from the mixing circuit 14 is permitted to pass which corresponds to the limited frequency range which may be transmitted by the associated magnetic tape and magnetic head.

Figure 4D:
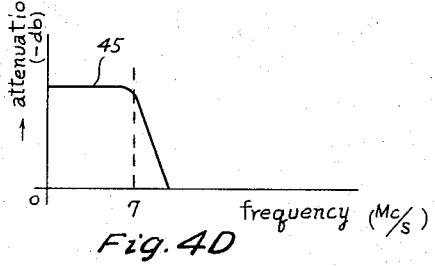

Generally speaking, recording or reproduction can be effected with single sideband or vestigial sideband transmission, so that the pass band of the filter 16 may be lower than 7 mc./s. as illustrated by the curve 45 in FIGURE 4D. The amplifier 17 is represented with a single transistor 46 in the figure, but it may be formed with a plurality of transistors.

In FIGURE 1, at the output of the Y signal amplifying and frequency modulating circuit 10, namely at the output of the amplifier 17, power amplifying circuits 47 and 47' are connected in parallel. These amplifiers may be formed with transistors, for example, and their respective outputs are connected to magnetic heads 48 and 49. The magnetic heads 48 and 49 record the frequency modulated Y signal on the magentic tape 1, but the one magnetic head 48 records primarily signals occurring in the vertical blanking intervals of the frequency modulated Y signal, while the other magnetic head 49 records chiefly signals other than those occurring in the vertical blanking periods. Accordingly, the magnetic head 48 is referred to as a synchronizing signal head and the head 49 is referred to as the luminance signal head. The relationship between such magnetic heads and the tape will be detailed later.

Figure 2A:
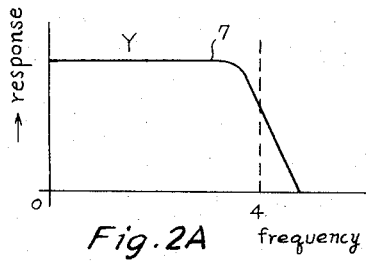
Figure 2B:
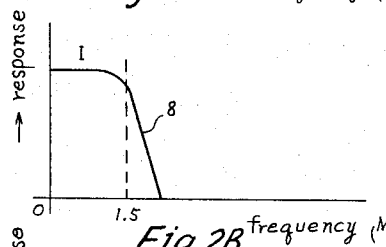

In FIGURE 1 the I signal having a band width such as shown by the curve 8 in FIGURE 2B and obtained at the terminal 6b of the decoder 5 is supplied to a mixing circuit 50 after being amplified, if necessary. The mixing circuit 50 may be formed with, for instance, a transistor if desired.

Figure 2C:
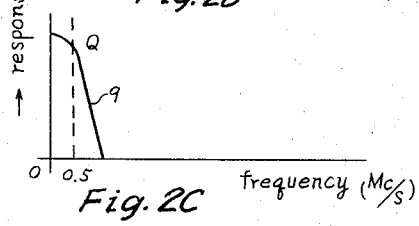

Further, the Q signal obtained at the terminal 6c of the decoder 5 which has a band width such as shown by the curve 9 in FIGURE 2C is supplied to a Q signal frequency modulating circuit 51. This Q signal frequency modulating circuit 51 can be formed essentially in the same manner as the Y signal amplifying and frequency modulating circuit 10 shown in FIGURE 3. Therefore, no detailed explanation will be made about this Q signal amplifying and frequency modulating circuit. However, the carrier frequency of the variable frequency oscillator is so selected as to be different from that of the above mentioned Y signal modulating circuit 10 and to be at least a frequency other than the band of the band-pass amplifier 13, namely other than from 64 to 76 mc./s. It is selected to be, for example, 60 mc./s. The band width of the band-pass amplifier is chosen ±1 mc./s. at the center frequency of 60 mc./s. in accordance with the frequency band width of the Q signal.

Figure 2D:
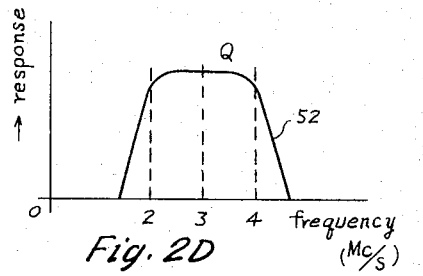

Furthermore, the fixed oscillation frequency of the local oscillator is selected, for instance, 57 mc./s. to obtain a beaten-down or converted frequency modulated Q signal such as illustrated by the curve 52 in FIGURE 2D.

Figure 2E:
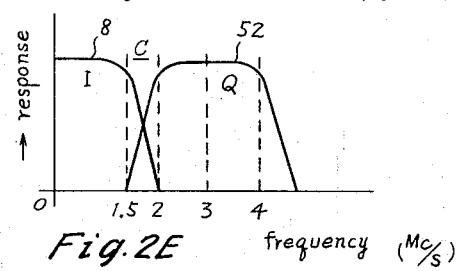

The resultant Q signal shown by the curve 52 in FIGURE 2D is applied to the mixing circuit 50 to which the aforesaid I signal is being supplied, and at the output terminals of circuit 50 is obtained a composite I and Q signal comprising components 8 and 52 of different band widths such as shown in FIGURE 2E. It must be noted here that the composite I and Q signal band can be made substantially equal to the Y signal band 7 shown in FIGURE 2A. In such a case, the respective characteristics of the luminance signal head 49 and a chrominance signal head 55 can be made substantially equal.

The composite I and Q signal obtained in the mixing circuit 50 is referred to as the chrominance signal in this specification and is supplied to a chrominance signal amplifying and frequency modulating circuit 53, the circuit construction of which may be essentially the same as that of the aforementioned Y signal amplifying and frequency modulating circuit 10 shown in FIGURE 3, or the Q signal amplifying and frequency modulating circuit 51 described above. Therefore, no detailed explanation need be made. However, the carrier frequency of the variable frequency oscillator of circuit 53 is selected to be a frequency which is different from those of the Y signal amplifying and frequency modulating circuit 10 and the Q signal amplifying and frequency modulation circuit 51 and at least outside the band of their band-pass amplifiers, namely a carrier frequency of such, for example, as 50 mc./s. Furthermore, the fixed oscillation frequency of the local oscillator is selected, for example, to be 45 mc./s. and a beaten-down or converted low frequency modulated chrominance signal is obtained which is lower than 7 mc./s. just as shown in FIGURE 4D for the Y signal. In this case influences of a leakage signal and a folded signal can be avoided effectively. According to the foregoing, there are advantages in that beat interference is not caused between the carrier frequencies $f_0$, $f_0'$ and those of the Q signal and the mixed I and Q signal.

The resultant signal from the chrominance signal amplifying and frequency modulating circuit 53 is supplied to the chrominance signal head 55 through a power amplifying circuit 54 which is preferably formed with a transistor.

The relationship between the aforementioned synchronizing signal head 48, Y signal head 49, chrominance signal head 55 and the magnetic tape 1, namely an example of a rotary magnetic head assembly will be explained hereinbelow.

FIGURE 5 is a perspective view of the rotary magnetic head assembly, generally indicated by the numeral 56. In the assembly 56, two rotary heads are mounted on a shaft 58 of a motor 57, which are spaced a distance D in the axial direction of the shaft and a predetermined angle with respect to the rotary shaft 58. These two magnetic heads correspond to the magnetic heads 48 and 49 shown in FIGURE 1. A cylindrical guide drum 59 is provided coaxially with the rotary shaft 58. As seen in FIGURE 5, the polar surfaces of the heads 48 and 49 lie substantially flush with the exterior surface of the drum 59 so as to be in suitable sliding contact with the active surface of the magnetic tape 1 where the paths of the respective heads intersect the path of the tape. The guide rollers 60a and 60b are offset axially of the drum 59 by a distance less than the width of the tape so that the entering portion of the tape is offset vertically by a distance somewhat less than the tape width with respect to the departing portion of the tape.

In operation, only one of the heads is in contact with the magnetic tape at a time and the other head is out of contact with the magnetic tape. As a result, magnetic tracks 64 and 65 are formed on the magnetic tape 1 by the magnetic heads 48 and 49 obliquely to the direction of travel or the length of the tape, as illustrated in FIGURE 6. On the magnetic track 64, primarily the vertical blanking signal is recorded, and on the track 65 there is recorded the Y signal other than the vertical blanking signal. The foregoing will be seen more clearly from FIGURE 8. That is, in FIGURE 8A, waveform 61 represents a continuous frequency modulated Y signal and the period $t_1$ is the vertical blanking period. A waveform 66 occurring during a certain period $t_2$ containing chiefly the vertical blanking signal within this period $t_1$ is indicated in FIGURE 8B and this waveform 66 is recorded on the magnetic track 64 by the magnetic head 48. On the other hand, the Y signal occurring primarily other than during the period $t_2$ as indicated by the waveform 67 in FIGURE 8C is recorded on the magnetic track 65 by the magnetic head 49. In practice, the signals 66 and 67 overlap partially in time.

In the present invention a rotary magnetic head 55 is mounted on the rotary shaft 58 for recording the chrominance signal. The magnetic head 55 is connected with the chrominance channel of the circuit shown in FIGURE 1. This rotary magnetic head 55 can be mounted to form an acute angle $L_1$ with respect to the luminance signal magnetic head 49 as illustrated in FIGURE 7A, or it can be offset in the axial direction of the rotary magnetic head 49 as shown in FIGURE 7B. Furthermore it can be disposed with the acute angle $L_1$ with respect to the rotary magnetic head 49 and on a different level from that of the head 49 as illustrated in FIGURE 7C. In FIGURE 7, 70 indicates a locus of rotation of the rotary magnetic head 48 and $L_2$ shows an angle between the rotary magnetic heads 48 and 49. Any dispositions of the rotary magnetic head 55 in FIGURES 7A to 7C will do. Thus, in any case magnetic tracks are formed by the magnetic head 55 between the adjacent luminance signal tracks 65 as illustrated by the dash lines 71 in FIGURE 6. With the disposition of the rotary magnetic heads 49 and 55 shown in FIGURE 7A, it is relatively difficult to make the tracks 65 and 71 of equal pitch such as shown in FIGURE 6. The disposition shown in FIGURE 7B is disadvantageous in that crosstalk is caused due to the adjacency of the magnetic heads 49 and 55. Of course, the two heads cannot be spaced apart more in the axial direction of shaft 58 because the chrominance signal then could not be recorded over a complete path across the magnetic tape. (See FIGURES 5 and 6). The disposition such as shown in FIGURE 7C is the most favorable. In this case the pitch of the magnetic tracks and influence of the crosstalk can be freely controlled.

The following explanation will be made in connection with the case where the luminance signal and the chrominance signal are recorded with a disposition of the magnetic heads 49 and 55 such as shown in FIGURE 7C. As described above with respect to FIGURE 1, the Y signal is recorded by the two magnetic heads 48 and 49 and the chrominance signal is recorded by the magnetic head 55. It must be noticed here that there is no synchronizing signal head with respect to the chrominance signal. Therefore, such fact must be taken into account during reproducing.

Where the aforementioned rotary magnetic head assembly 56 is used the Y signal 61 such as illustrated in FIGURE 8A can be recorded on each of the tracks 64 and 65 for one field or one frame and the chrominance signal 72 such as shown in FIGURE 8D can be recorded on a single track 71 without the vertical blanking signal as illustrated by the numeral 73 in FIGURE 8E.

The reproducing units will hereinbelow be explained. In FIGURE 1, reference numerals 48', 49' and 55' designate the respective reproducing magnetic heads. The magnetic heads 48, 49 and 55 used during recording can be used also as the reproducing heads. The reproduced intermittent synchronizing signal 66' such as shown in FIGURE 8B and which is obtained from the synchronizing signal reproducing magnetic head 48' is supplied to a preamplifier 74, and the reproduced intermittent modulated luminance signal 67' such as shown in FIGURE 8C which is obtained from the luminance signal reproducing magnetic head 49' is supplied to preamplifier 75. The reproduced synchronizing signal 66' and the reproduced luminance signal 67' from the preamplifiers 74 and 75 are supplied to a common switching circuit 76. In this case the amplitude levels of the reproduced signals 66' and 67' are made different from each other and supplied to electronic switching devices or gates to combine the signals without overlap as to time to form a continuous reproduction of the recorded signals. The reproduced intermittent, frequency modulated chrominance signal 73' such as shown in FIGURE 8E which is obtained from the chrominance signal reproducing head 55' is supplied through a preamplifier 77 to a switching circuit 78. To the switching circuit 78, there is supplied a low carrier frequency of 5 mc./s. having no modulation component from the chrominance signal amplifying and frequency modulating circuit 53 of recording unit 2. This switching circuit 78 is provided to insert the aforementioned low carrier frequency into the "off" period $t_3$ of the reproduced intermittent chrominance signal 73' illustrated in FIGURE 8E. As a result of this, influences due to noise can be avoided. That is, when the signal 73' reproduced by the magnetic head 55' is frequency-demodulated after being amplitude-limited and amplified, noises corresponding to the "off" period $t_3$ of the signal 73' are caused. Consequently even if the period $t_3$ corresponds to the vertical blanking period, the clamp level of the signal for the succeeding one field or one frame is varied, thereby causing reduction of fidelity of color reproduction, jittering of the reproduced picture and variation of color.

To the switching circuits 76 and 78, switching or gate pulses are applied respectively. The switching pulses are produced precisely in synchronism with movement of the rotary shaft 58 of the rotary magnetic head assembly 56 and in accordance with the angle between the magnetic heads 48 and 49. In the lower portion of FIGURE 1, 79 indicates a switching pulse generator, which can be formed by means of a permanent magnet 80 which rotates with head assembly 56 adjacent the path thereof and a pulse shaping and triggering circuit 82 for shaping pulse signals from the head 81. The switching pulse generator 79 of such construction has heretofore been well known, so that explanation in detail will not be made.

In FIGURE 8F, the output waveform 83 of the switching pulse generator 79 is indicated. The "on or "off" period of this waveform 83 is, of course, maintained precisely in synchromism with the "off" periods $t_2$ and $t_3$ of the reproduced signals 66', 67' and 73' by the magnetic heads 48', 49' and 55'. The phase of the pulse portions 83a of waveform 83 coincides with "off" periods $t_3$ of the reproduced chrominance signal 73' obtained by the magnetic head 55', if the magnetic heads 48, 49 and 55 are used during reproduction also and are positioned as shown in FIGURE 7C and, for example, the magnetic head 55 precedes magnetic heads 48 and 49 with respect to the direction of head rotation. The switching pulse portions 83a are applied to a phase splitter 84, FIGURE 1, to provide at lines 84a and 84b respective timed pulses 85a and 85b for application to the switching device 78. The pulse waveform 83 cannot be applied directly to the switching device 76 because a rotational phase difference (corresponding to angle $L_1$ in FIGURE 7C) exists between the magnetic heads 49 and 55. Therefore, in this invention, the switching pulse waveform 83 is applied through a delay circuit 86 to a phase splitter 87, providing pulses 88a and 88b of opposite polarities such as shown in FIGURES 8I and 8J at output lines 87a and 87b. The phase difference between the pulse waveforms 85a and 85b and the pulse waveforms 88a and 88b is determined in accordance with the phase difference $\tau$ between the signals 67' and 76' illustrated in FIGURES 8C and 8E.

As is well known, the phase splitters 84 and 87 can be formed with transistors and it will be seen that the pulses 85a, 85b and 88a, 88b of opposite polarities can be produced by obtaining outputs from the collectors and emitters of the output stages of the transistor phase splitter circuits. Therefore, explanation in detail thereof need not be made. The delay circuit 86 may be formed with a delay coil and a transistor, so that a detailed explanation is unnecessary.

Referring to FIGURE 9, the switching circuit 78 may consist of an amplifier 91 including an amplifier stage 91a and a series circuit of transistors 89 and 90 to which is supplied the output signal 73′ from the amplifier 77. As shown in FIGURE 9, circuit 78 may also include an amplifier 95 comprising an amplifier stage 95a and a series circuit of transistors 93 and 94 to which is supplied a low frequency carrier wave 92 such as shown in FIGURE 8K from the chrominance signal frequency modulating circuit 53, and an amplifier 97 including a transistor 96 which is common to the amplifiers 91 and 95 and an output amplifier stage 97a. By applying the switching pulse waveform 85a from the phase splitter 84 via line 84a to the base of the transistor 90 of the one amplifier 91 and the switching pulse waveform 85b via line 84b to the base of the transistor 94 of the other amplifier 95, the two amplifiers 91 and 95 are switched "on" and "off" alternately. Thus, the reproduced signal 73′ shown in FIGURE 8E and the low frequency carrier wave 92 which is intermittent as indicated by waveform 98 in FIGURE 8L are applied together to the transistor 96 of the amplifier 97. The signal shown in FIGURE 8M is a continuous signal 99 composed of signals 73′ and 98.

The switching circuit 76 can be formed in the same manner as that described above in FIGURE 9. That is, the reproduced amplified signals 66′ and 67′ such as illustrated in FIGURES 8B and 8C are supplied to the circuit 76 respectively from the amplifiers 74 and 75, and further the delayed switching pulses 88a and 88b are supplied to the switching device 76. As a result of this, a sequential signal 100 composed of the signals 66′ and 67′ such as shown in FIGURE 8N can be obtained. In the foregoing, it has been described that the amplitudes of the signals 98 and 73′ or signals 66′ and 67′ are of substantially the same amplitude, but this can, of course, be changed at will. It is preferable to select the amplitude of the signal 98 or 66′ smaller than that of the signal 73′ or 67′.

The composite sequential signal 100 from the switching circuit 76 is supplied through an amplitude limiter 101 to a demodulator 102 for the Y signal. Since the amplitude limiter 101 and the frequency demodulator 102 may be formed by known circuits, no detailed explanation need be made.

Thus, the Y signal shown in FIGURE 4D is produced in the frequency demodulator 102 for the Y signal and is supplied to a matrix circuit 104 through a delay amplifier 103.

The output signal 99, FIGURE 8M, from the switching circuit 78 is supplied through an amplitude limiter 105 to a demodulator 106 for the chrominance signal. Thus, the chrominance signal shown in FIGURE 2E is obtained in the frequency demodulator 106 for the chrominance signal (the Q signal still being frequency-modulated).

In this case the waveform 99 during the period $t_3$ is a carrier frequency having no modulated components, and hence its demodulated output becomes zero as illustrated in FIGURE 8O. The demodulator 106 thus supplies an intermittent chrominance signal 107. It must be noticed that the period of zero amplitude does not contain noise and hence the clamp level in the matrix circuit 104 is not caused to vary.

The chrominance signal 107 demodulated by the demodulator 106 is supplied to a separator 108 for I and Q signals. This circuit can be formed with a parallel circuit with one branch comprising a low-pass filter having an upper limit of, for example, 1.5 mc./s. and with the other branch comprising a band-pass filter of 2 to 4 mc./s., as is apparent from FIGURE 2E. Then, by the circuit 108 such I signal of the band as shown in FIGURE 2B and such frequency modulated Q signal as shown in FIGURE 2D are separated respectively.

The I signal from the circuit 108 is supplied through an amplifier 109 to the matrix circuit 104.

The frequency modulated Q signal must be frequency demodulated again. In this case a noise signal is also produced in the "off" period $t_3$ and it is demodulated to exert a bad influence upon the Q signal, so that a switching device or gate 110 is provided to avoid the trouble. To this circuit, a low frequency carrier wave of 3 mc./s. is supplied which is obtained in the Q signal frequency modulating circuit 51 in the recording unit. FIGURE 10 illustrates a suitable switching circuit consisting of transistors. The frequency modulated Q signal from the I and Q signals separator 108 is applied to a terminal 115 and amplified by transistors 116 and 117. On the other hand, the carrier frequency from the Q signal modulator 51 is applied to a terminal 119. To the bases of transistors 123 and 124, the switching pulses 85a and 85b are applied, and a sequential Q signal is led out from a terminal 126.

This output from switching circuit 110 is supplied through an amplitude limiter 111 to a demodulator 112 for the Q signal. Thus, in the Q signal frequency demodulator 112 a Q signal having such band width as shown in FIGURE 2C is obtained and then it is supplied to the matrix circuit 104 through an amplifier 113.

Also in this case, no noise signal is demodulated in the frequency demodulator 112 by the provision of the switching circuit 110, and hence there is no fear of causing any variations in the clamp level in the matrix circuit 104.

Then, the Y signal, the Q signal and the I signal, respectively having band widths such as shown in FIGURES 2A, 2B and 2C, are supplied to the matrix circuit 104 and a red signal R, a blue signal B and a green signal G are obtained respectively at three output terminals 114a, 114b and 114c of the matrix circuit.

The circuit connections are apparent from the drawing. In one particular example, a circuit was constructed in accordance with the foregoing in which the various components had values as follows:

Voltage B++ = +24 volts
Voltage B+ = +10 volts

| Resistors: | Ohms |
|---|---|
| 25 | 6.8K |
| 26 | 1.8K |
| 27 | 330 |
| 127 | 330 |
| 128 | 10K |
| 129 | 15K |
| 130 | 4.7K |
| 131 | 470 |
| 132 | 250K |
| 133 | 4.7K |
| 134 | 1.2K |
| 135 | 33 |
| 136 | 200 |
| 150 | 1.8K |
| 151 | 220 |
| 152 | 100 |
| 153 | 100 |
| 154 | 27K |
| 137 | 6.8K |
| 138 | 1.8K |
| 139 | 15K |
| 140 | 1.8K |
| 141 | 220 |
| 142 | 100 |
| 143 | 100 |
| 144 | 27K |
| 145 | 1.5K |
| 146 | 22K |
| 147 | 3.3K |
| 148 | 820 |
| 149 | 15K |

Resistors: | Ohms
--- | ---
173 | 500
174 | 43K
175 | 2.7K
176 | 3.9K
177 | 220
155 | 1.5K
156 | 43K
157 | 2.7K
158 | 3.9K
159 | 220
160 | 22K
161 | 3.3K
162 | 3.9K
163 | 680
164 | 1.5K
165 | 5.1K
166 | 1.8K
167 | 100
168 | 220
169 | 100
170 | 11K
171 | 1.5K
172 | 82
178 | 22K
179 | 3.3K
180 | 3.9K
181 | 680
182 | 1.5K
183 | 8.2K
184 | 1.8K
185 | 100
186 | 100
187 | 47K
188 | 1.5K
189 | 33
190 | 2.2K
191 | 3.9K
192 | 3.3K
193 | 100
194 | 1.8K K stands for a multiplying factor of 1000.

Capacitors:
21 picofarads 50
22 do 45
23 do 50
28 do 45
39 do 50
40 do 50
198 do 500
199 microfarads 0.0015
41 picofarads 50
42 do 50
44 do 10
195 do 10
196 do 680
197 microfarads 0.01
207 do 0.0047
208 do 0.05
200 do 0.0047
201 do 0.0047
202 do 0.05
203 do 0.1
204 do 0.05
205 picofarads 200
206 microfarads 0.0047
209 do 0.1
210 do 0.05
211 picofarads 200
212 do 300
213 microfarads 0.002
124 do 0.005
215 do 0.05

One picofarad = $10^{-12}$ farads.

Inductors:
20 microhenries 0.79
38 do 0.79
43 do 10.0

Diodes:
24 MA-301
31, 32 IS-306

It will be evident from the foregoing that, according to the present invention a luminance signal and a chrominance signal are provided from a color video signal of the NTSC system and recorded on magnetic tape by a magnetic head assembly or reproduced therefrom.

In this case the band widths of the luminance signal and the chrominance signal can be made substantially equal to each other.

Furthermore, when luminance and chrominance frequency modulation signals having low frequency carrier waves are produced, the signals are subjected to heterodyne detection and applied to band-pass filters thereby to remove unnecessary components, so that faithful color pictures can be reproduced. During reproducing of the chrominance signal a switching circuit is utilized to mix a certain carrier frequency. Thus noise and variations in clamp level are not caused.

It will be apparent that many modifications and variations may be effected without departing from the scope of the novel concepts of this invention.

I claim:

1. In an apparatus for recording and/or playing back color television signals on a magnetic tape, comprising means for separating a color television signal into three components, Y, I and Q signals respectively, means for mixing said I and Q signals, means for frequency modulating said mixed I and Q signals, means for recording said frequency-modulated mixed I and Q signals on a magnetic tape through only a single rotary head, and means for reproducing an intermittent recorded I and Q signal having successive "off" periods, the improvement comprising means for adding a constant frequency signal to the "off" periods of the reproduced I and Q signal, and means for controlling the last-mentioned means and comprising means for producing a switching pulse waveform synchronized with the rotation of said rotary head.

2. An apparatus for recording and/or playing back color or monochrome television signals on a magnetic tape comprising a rotary head assembly having at least three magnetic heads for forming skew magnetic tracks on the magnetic tape, the first and second heads being able to scan substantially separate laterally offset recording regions on said tape, means for separating a color television signal into three signal components; means including the first and second heads, for recording one of the signal components on the magnetic tape, one of the recording regions being arranged to receive substantially only a vertical synchronizing signal associated with the one signal component, the other recording region being arranged to receive substantially only the remainder of the one signal component; means for mixing the remaining two signal components in different frequency bands to provide a resultant mixed signal; means including a third of the heads, for recording the resultant mixed signal on the magnetic tape; wherein said one of the signal components is a Y signal and the remaining two signal components are the I and Q signals, and said mixing means comprises means for mixing the I and Q signals; and said apparatus further comprising means for frequency-modulating a carrier wave with the mixed I and Q signals; means for playing back an intermittent recorded I and Q signal having successive "off" periods; means for adding a constant frequency signal during the "off" periods of the played back I and Q signal; and means for controlling the last-mentioned means, comprising means for producing a switching pulse wave synchronized with the rotation of the rotary head.

References Cited

UNITED STATES PATENTS

| | | | |
|---|---|---|---|
| 3,040,125 | 6/1962 | Dillenburger et al. | 178—6.6 |
| 3,180,929 | 4/1965 | Hubbard et al. | 178—6.6 |
| 3,188,385 | 6/1965 | Kihara | 178—6.6 |
| 3,230,306 | 1/1966 | Takayanagi | 178—6.6 |
| 3,234,323 | 2/1966 | Kihara | 178—5.2 |

ROBERT L. GRIFFIN, *Acting Primary Examiner.*

JOHN W. CALDWELL, *Examiner.*

J. A. O'BRIEN, R. MURRAY, *Assistant Examiners.*